G. CODY.
ANTISIPHON SELF SCOURING TRAP.
APPLICATION FILED MAR. 24, 1910.

1,112,437.

Patented Oct. 6, 1914.
2 SHEETS—SHEET 1.

WITNESSES:
William Miller
Christian Almstaedt

INVENTOR
George Cody
BY
Hauff & Barland
ATTORNEYS

G. CODY.
ANTISIPHON SELF SCOURING TRAP.
APPLICATION FILED MAR. 24, 1910.
1,112,437.
Patented Oct. 6, 1914.
2 SHEETS—SHEET 2.
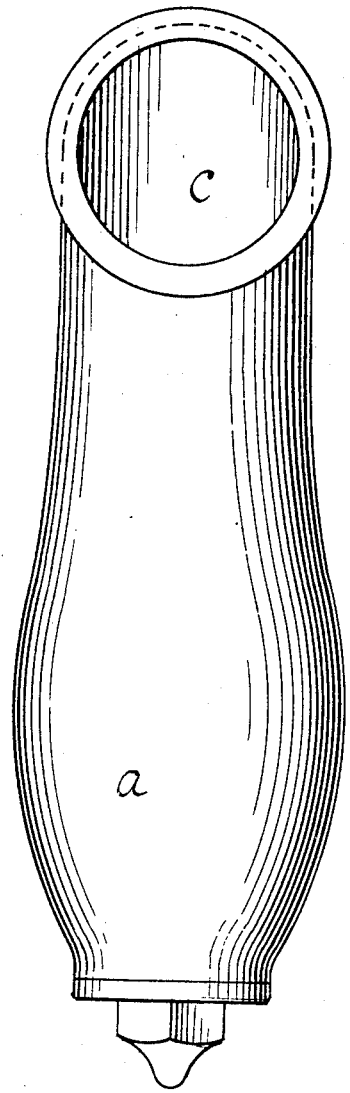
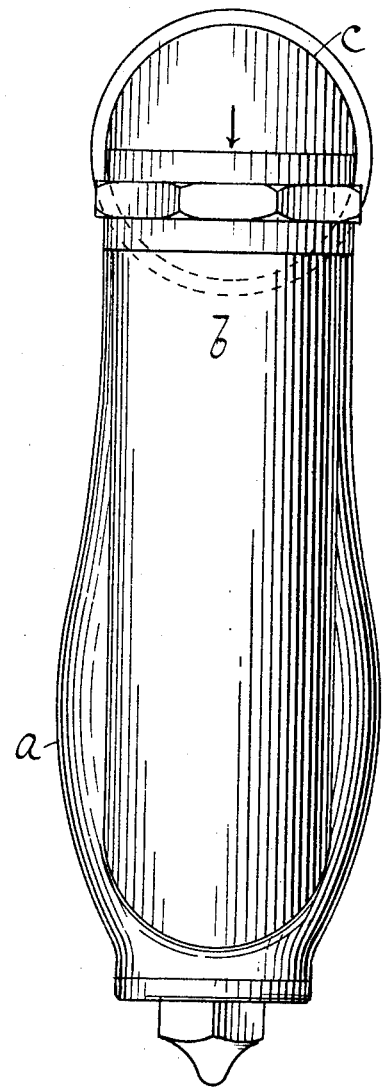
WITNESSES:
William Miller
Christian Almstaedt
INVENTOR
George Cody
BY
Hauff & Garland
ATTORNEYS

UNITED STATES PATENT OFFICE.

GEORGE CODY, OF BROOKLYN, NEW YORK.

ANTISIPHON SELF-SCOURING TRAP.

1,112,437.  Specification of Letters Patent.  Patented Oct. 6, 1914.

Application filed March 24, 1910. Serial No. 551,381.

*To all whom it may concern:*

Be it known that I, GEORGE CODY, a citizen of the United States, residing at Brooklyn, in the county of Kings and State of New York, have invented new and useful Improvements in Antisiphon Self-Scouring Traps, of which the following is a specification.

This invention relates to sewer gas traps and is designed to produce a trap for use on the discharge pipes of wash basins, sinks, tubs and various kinds of plumbing apparatus, other than water closets, which will reëstablish a water seal after any suction or siphonic action due to the flow of water through the main discharge pipe from upper floors of the building in which the apparatus is installed. Where a building has a number of sets of plumbing apparatus of the ordinary character installed on different floors and all connected to one discharge pipe leading to the sewer there is a tendency for every flow of water from the apparatus on one floor to produce a suction in the branches of pipe leading to each set of apparatus on the lower floors. This suction is often strong enough to pull air through the traps forming the seals for such branch connections on the lower floors and, unless the traps are properly designed, the air so sucked through will drive before it so much of the water standing in such lower traps that there will not be enough left to reëstablish the seal in said lower traps after the suction ceases. This renders the whole system unsanitary and obnoxious to the regulations of the building and health departments of modern city governments. Such trap must also be free from various other objections in order to pass inspection and I have invented a trap to meet these requirements which is anti-siphonic, in that the seal cannot be destroyed by siphonic or air sucking action, which is self scouring in flushing, *i. e.* is automatically cleaned by the ordinary gravity flow of water therethrough, and which has no interior partitions extending above the level of the water left by a normal suction-produced flow of air through it.

Figure 1:
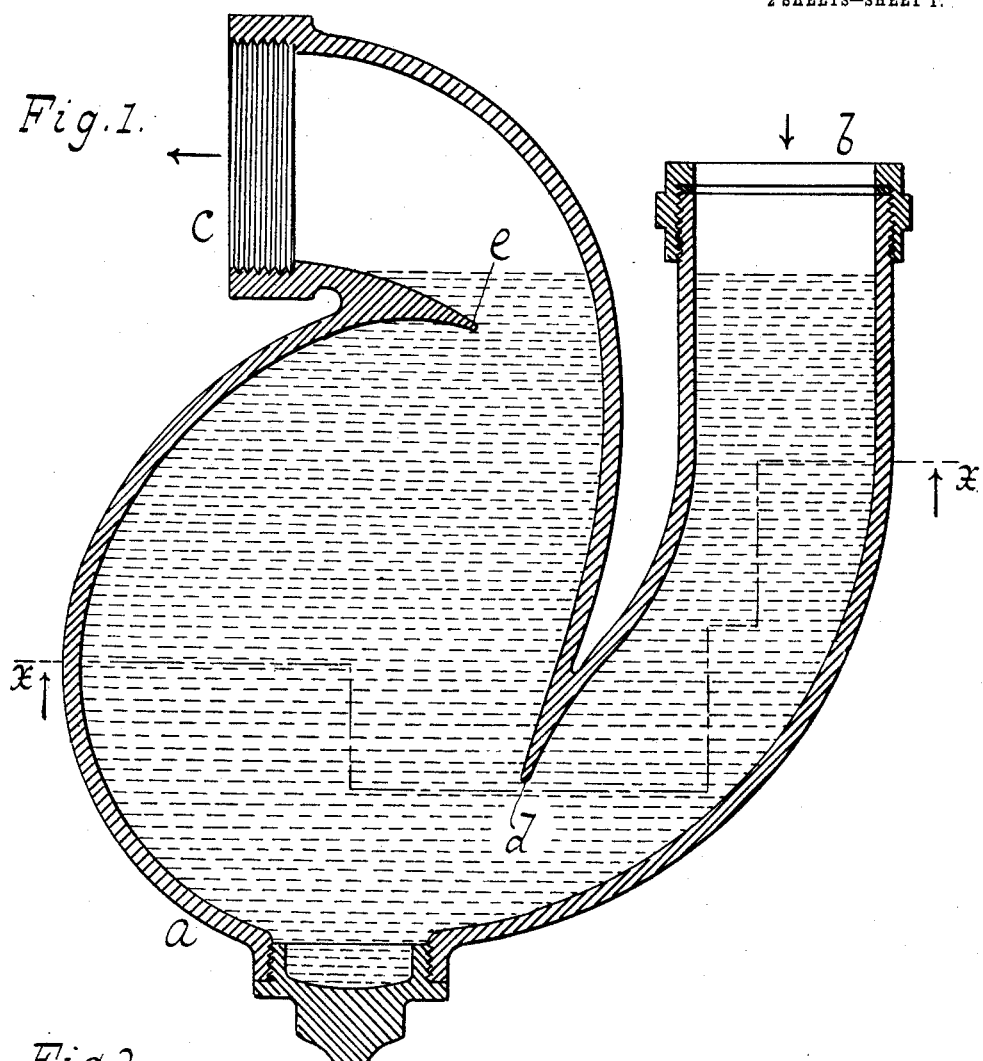
Figure 2:
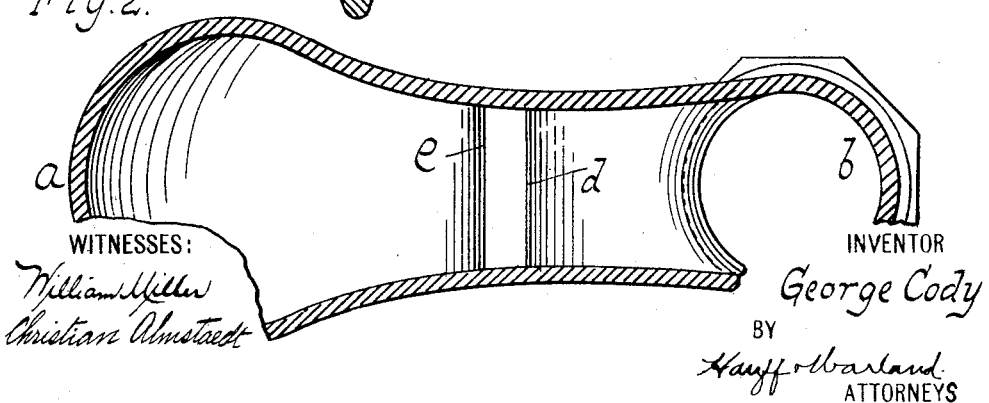

The best form of trap at present known to me embodying my invention is illustrated in the accompanying two sheets of drawing in which, Figure 1 is a sectional side elevation of the trap exposing its interior construction. Fig. 2 is a section along $x$—$x$ Fig. 1. Fig. 3 is a rear view of the trap looking into the outlet mouth, and Fig. 4 is a front view of the trap looking at the inlet leg.

Throughout the drawings like reference characters indicate like parts.

$a$ is the main body of the trap.

$b$ is the inlet leg or branch and $c$ the outlet leg or outflow branch. The inlet leg $b$ is wholly exterior to the body $a$ and joins the same at one side of the trap near the bottom, preferably forming a continuous curve with the bottom of the trap as shown. The inlet leg is disposed in a substantially vertical position, and its highest exterior point of juncture or connection with the body of the trap is below the level of the water left in the trap after a normal suction-produced flow of air has passed through it. The leaving of a sufficient quantity of water in the trap to produce this result is due to its internal configuration as shown in the drawings. The bottom and that side of the trap body opposite to the inlet sweep in a continuous curve up and back to the outlet connection to the outlet leg $c$, meeting said outlet leg in a sharp horizontally extending cut off lip $e$, which has a curved lower face into which the wall line of the trap merges. The upper surface of the lip $e$ slopes backward toward the trap body so that any water left in the outlet leg when the suction ceases flows back into the trap body. In horizontal cross section, as shown in Fig. 2, the trap body is widest nearest the side of the trap body opposite the side at which the inlet and outlet are located. The side of the trap body nearest which the inlet and outlet are situated has preferably a slight outward curve and the opposite side has a pronounced outward curve, all as shown in Fig. 1. Preferably there is a sharp downwardly extending lip $d$ at the juncture of the inlet leg and the main body of the trap, which forms a sharp, sealing, cut-off edge. The body of the trap is also bulged out sidewise near the bottom, as shown in Figs. 3 and 4, so as to give it a greater capacity at and near the bottom, and the curvature of the bottom brings it to a lower level than the inlet orifice.

Such being the construction, the operation of the trap is as follows: When there is a flushing of the trap, i. e. a flow of water produced by gravity through the trap, as when the wash basin or other receptacle to the waste pipe of which it is connected is emptied, the current sweeps through the body of the trap from inlet to outlet, following naturally the curvature of the body without meeting any obstructions to form eddies, and carrying with it all impurities automatically cleansing and scouring the trap. When the flow ceases the water stands in the position shown in Fig. 1, forming a gas tight seal. When there is a flow of water down the main sewer pipe (not shown) extending to an upper floor or floors, a suction is produced in the outlet leg $c$ which draws a portion of this water out through outlet leg $c$, and when the level in the inlet leg $b$ falls to the level of the cut-off lip $d$, air is also sucked through. This air, however, being much lighter than the water, has less momentum, and, as it passes under the lip, its buoyancy causes its course to be sharply deflected and it bubbles straight upward to outlet leg $c$, along the slightly curved wall on the right side of the trap (looking at Fig. 1). The water driven before the air, being much heavier, has more momentum, passes straight on and piles up against the opposite side where the trap is most capacious, or if any of it is carried all the way up along said opposite wall by its momentum, it runs under the lip $e$ and is thrown backward and downward thereby, tumbling over and over in the curvilinear shaped trap body without being drawn out of it. When the suction and flow of air cease there is still enough water left in the trap, after any normal flow of air therethrough, to drop back into the bottom of the trap and flow up into the inlet leg $d$ far enough to bring the water level considerably above the highest exterior point of juncture of trap body and inlet leg, although not to as high a level as shown in Fig. 1. Any water left in the outlet leg $c$ also runs back over the watershed formed by the backwardly inclined upper surface of lip $e$ as before explained, and is returned to the trap. This feature of operation of the trap is due to the fact that the outlet orifice left by the lip $e$ is much smaller than the largest horizontal cross section of the trap (in fact smaller than any such cross section) and is located all on one side of any vertical plane dividing the trap body into two portions of equal capacity, the inlet orifice left by lip $d$ being also on this side of the trap. Consequently when the passing current of air travels directly from inlet to outlet, a sufficient quantity of water is left undisturbed by it on the other side of the trap to restore the normal water level, after siphoning, at a point above the highest exterior point of juncture between the trap body and inlet leg, that point of juncture being preferably placed much lower than the outlet orifice and nearer to the inlet than to the outlet. As a result a perfect gas seal is reëstablished and the level of the water seal being above the interior lip $d$, and the upper portion of the water resting at every point against walls which are exposed to the outer air, any leakage through said walls which might be due to corrosion of the material, or imperfections in casting, becomes immediately apparent, and leads to repair or replacement of an imperfect trap.

In other forms of trap where the seal is formed wholly by an interior partition, any such perforation above the water level in such interior partition would not be apparent on external inspection, and sewer gas could leak through above the water, the seal thereby being destroyed. This feature of construction and operation above described is one absolutely required by most sanitary building laws, i. e. the seal must be formed by exteriorly exposed trap walls, or, to put it in other language, there must be air space entirely around both portions of the trap containing the water seal and above their highest point of exterior connection, so that any opening through which gas or water might pass may be discovered on inspection when the trap is in operation.

Another practical advantage of my invention is that the trap is of a shape such that it can be easily cast in one piece, the cores being easily removed, and the mold easily divided.

There are no pockets or corners in the trap interior in which solid matter can accumulate. Practically all dirt is swept out on each flushing of the trap, and any particularly heavy material which can not be so flushed out will deposit at the bottom of the trap, where it will drop out on removing the plug $p$.

As above explained, an ample seal is secured at all times against any backward flow of sewer gas, and without the use of any heavy liquid such as mercury, which would form an obstruction to the normal flow of water in flushing operations, besides being costly and unhealthy.

Having, therefore, described my invention, I claim:

1. An automatic anti-siphon self-scouring trap having an inlet at the bottom, and a horizontally extending outflow connection from the top, the outer wall of the trap being extended inwardly at its junction with the outflow connection, and inclined continuously downward from said junction, so as to form a combined cut-off lip and return water shed when the trap is siphoning.

2. An automatic anti-siphon self scouring trap consisting of a bulging curvilinear body, to which are joined an inlet leg and an outlet leg, a sharp sealing cut off edge in said trap formed at the juncture of the wall of the trap body and inlet leg, the body of the trap being bulged and of greater capacity at the point farthest from the inlet leg, and a sharp sealing cut off edge in the body of the trap at the outlet and below the level of the outflow from the outlet leg.

3. An automatic anti-siphon self-scouring trap having an inlet at the bottom, and a horizontally extending outflow connection from the top, the outer wall of the trap being extended inwardly at its junction with the outflow connection, and inclined continuously downward from said junction, so as to form a combined cut-off lip and return water shed when the trap is siphoning, the body of the trap having its largest horizontal cross section near its bottom.

4. An automatic anti-siphon self-scouring trap having an inlet at the bottom, and a horizontally extending outflow connection from the top, the outer wall of the trap being extended inwardly at its junction with the outflow connection, and inclined continuously downward from said junction, so as to form a combined cut-off lip and return water shed when the trap is siphoning, the body of the trap having its largest horizontal cross section near its bottom and being curvilinear in outline of intersection with planes of every angle of direction.

5. An automatic, anti-siphon, self scouring trap having its interior free from partitions or other obstructions to the flow of water, an outlet at the top and an inlet on one side at the bottom of the trap body, in combination with an exterior vertically disposed inlet leg connected to the trap body inlet, the highest exterior point of connection between the body and inlet leg being below the lowest normal level of water in said trap.

6. An automatic, anti-siphon, self scouring trap having a trap body with an outlet at the top, the opening to which outlet is wholly on one side of a vertical plane dividing the body of the trap into two parts of equal capacity, in combination with an exterior vertically disposed inlet leg connected to the trap body at the bottom and on the same side as the outlet opening, the highest exterior point of connection between the body and the inlet leg being below the level of the outlet.

7. An anti-siphon trap having a body formed of continuously curved walls, an outlet opening at the top of width and cross section much smaller than the greatest width and largest horizontal interior cross section of the trap body, and located on one side thereof, in combination with an exterior vertically disposed inlet leg connected to the trap body at the bottom thereof and on the same side as the outlet opening, the highest exterior point of connection between the body and the inlet leg being nearer to the inlet than to the outlet.

8. An automatic, anti-siphon, self scouring trap having its interior free from partitions or other obstructions to the flow of water, an outlet at the top and an inlet on one side at the bottom of the trap body, in combination with an exterior vertically disposed inlet leg connected to the trap body inlet, the highest exterior point of connection between the body and the inlet leg being below the water line of the water left in the trap after a normal suction-produced flow of air through it, said inlet and outlet openings being on the same side of the trap body, and the trap body being widest in horizontal cross section near the other side.

9. An automatic, anti-siphon, self scouring trap having its main body provided with an inlet near the bottom and outlet near the top, both on one side of said trap body, the widest point of the interior horizontal cross section being nearest the other side of the trap body.

10. An automatic, anti-siphon, self-scouring trap having its main body provided with inlet and outlet openings at or near one side, the outlet being above the inlet, a downwardly extending lip over the inlet opening, and a backwardly and horizontally extending lip with a curved lower face located at the outlet opening, said trap body having its interior wall face opposite to the inlet opening shaped in a continuous curve which merges into the curved lower face of the outlet lip.

11. An automatic, anti-siphon, self scouring trap having its main body provided with an inlet at one side near the bottom, an outlet at the top nearest the same side, and an outwardly curved wall on the same side extending from the inlet up to the outlet.

12. An automatic, anti-siphon, self scouring trap having its main body provided with an inlet at one side near the bottom, an outlet at the top nearest the same side, and an outwardly curved wall on the same side extending from the inlet up to the outlet, the trap body having the widest portion of its horizontal cross section nearest the side opposite the inlet.

13. An automatic, anti-siphon, self scouring trap having its main body provided with an inlet at one side near the bottom, an outlet at the top nearest the same side, and an outwardly curved wall on the same side extending from the inlet up to the outlet, the bottom and other wall of the
5 trap body forming a continuous curve outward and upward to the outlet.

In testimony whereof I have hereunto set my hand in the presence of two subscribing witnesses.

GEORGE CODY.

Witnesses:
 FRANCIS H. WARLAND,
 CHRISTIAN ALMSTAEDT.

Copies of this patent may be obtained for five cents each, by addressing the "Commissioner of Patents, Washington, D. C."